(12) United States Patent
Yang et al.

(10) Patent No.: US 11,335,045 B2
(45) Date of Patent: May 17, 2022

(54) COMBINING FEATURE MAPS IN AN ARTIFICIAL INTELLIGENCE SEMICONDUCTOR SOLUTION

(71) Applicant: Gyrfalcon Technology Inc., Milpitas, CA (US)

(72) Inventors: Bin Yang, San Jose, CA (US); Lin Yang, Milpitas, CA (US); Xiaochun Li, San Ramon, CA (US); Yequn Zhang, San Jose, CA (US); Yongxiong Ren, San Jose, CA (US); Yinbo Shi, Santa Clara, CA (US); Patrick Dong, San Jose, CA (US)

(73) Assignee: Gyrfalcon Technology Inc., Milpitas, CA (US)

( * ) Notice: Subject to any disclaimer, the term of this patent is extended or adjusted under 35 U.S.C. 154(b) by 384 days.

(21) Appl. No.: 16/733,485

(22) Filed: Jan. 3, 2020

(65) Prior Publication Data
US 2021/0209822 A1   Jul. 8, 2021

(51) Int. Cl.
*G06K 9/62* (2022.01)
*G06T 11/60* (2006.01)
*G06N 3/08* (2006.01)
*G06N 5/04* (2006.01)
*G06N 20/00* (2019.01)
*G06N 3/063* (2006.01)

(52) U.S. Cl.
CPC ............ *G06T 11/60* (2013.01); *G06N 3/063* (2013.01); *G06N 3/084* (2013.01); *G06N 5/046* (2013.01); *G06N 20/00* (2019.01); *G06T 2210/22* (2013.01)

(58) Field of Classification Search
CPC ..... G06T 11/60; G06T 2210/22; G06N 3/063; G06N 3/084; G06N 5/046; G06N 20/00; G06N 3/08; G06N 3/0454
USPC ......................................................... 382/156
See application file for complete search history.

(56) References Cited

U.S. PATENT DOCUMENTS

2021/0319560 A1* 10/2021 Xia .......................... G06T 7/11

* cited by examiner

*Primary Examiner* — Charlotte M Baker
(74) *Attorney, Agent, or Firm* — Wolf, Greenfield & Sacks, P.C.

(57) ABSTRACT

In some embodiments, a system includes an artificial intelligence (AI) chip and a processor coupled to the AI chip and configured to receive an input image, crop the input image into a plurality of cropped images, and execute the AI chip to produce a plurality of feature maps based on at least a subset of the plurality of cropped images. The system may further merge at least a subset of the plurality of feature maps to form a merged feature map, and produce an output image based on the merged feature map. The cropping and merging operations may be performed according to a same pattern. The system may also include a training network configured to train weights of the CNN model in the AI chip in a gradient descent network. Cropping and merging may be performed over the training sample images in the training work in a similar manner.

20 Claims, 6 Drawing Sheets

COMBINING FEATURE MAPS IN AN ARTIFICIAL INTELLIGENCE SEMICONDUCTOR SOLUTION

FIELD

This patent document relates generally to artificial intelligence semiconductor solutions. Examples of combining output of feature maps to improve image resolution in an artificial intelligence semiconductor are provided.

BACKGROUND

Artificial intelligence (AI) semiconductor solutions include using embedded hardware in an AI integrated circuit (IC) to perform AI tasks. Such hardware-based solutions still encounter the challenges of making an AI semiconductor practically useful for many applications. For example, in an image application implemented in a hardware solution, the size of the feature maps from an AI network are generally reduced from the original image size. In an example AI semiconductor that contains a convolutional neural network (CNN), the sizes of the feature maps from pooling layers decrease as it goes deeper in the CNN. For example, a CNN may convert an input image of a size of 224×224 to a 7×7 feature map at the output, rendering the output feature map less useful for some image applications due to the low resolution.

BRIEF DESCRIPTION OF THE DRAWINGS

The present solution will be described with reference to the following figures, in which like numerals represent like items throughout the figures.

DETAILED DESCRIPTION

As used in this document, the singular forms "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An example of "artificial intelligence logic circuit" and "AI logic circuit" includes a logic circuit that is configured to execute certain AI functions such as a neural network in AI or machine learning tasks. An AI logic circuit can be a processor. An AI logic circuit can also be a logic circuit that is controlled by an external processor and executes certain AI functions.

Examples of "integrated circuit," "semiconductor chip," "chip," and "semiconductor device" include integrated circuits (ICs) that contain electronic circuits on semiconductor materials, such as silicon, for performing certain functions. For example, an integrated circuit can be a microprocessor, a memory, a programmable array logic (PAL) device, an application-specific integrated circuit (ASIC), or others. An AI integrated circuit may include an integrated circuit that contains an AI logic circuit.

Examples of "AI chip" include hardware- or software-based device that is capable of performing functions of an AI logic circuit. An AI chip may be a physical IC. For example, a physical AI chip may include a CNN, which may contain weights and/or parameters. The AI chip may also be a virtual chip, i.e., software-based. For example, a virtual AI chip may include one or more processor simulators to implement functions of a desired AI logic circuit.

Examples of "AI model" include data containing one or more parameters that, when loaded inside an AI chip, are used for executing the AI chip. For example, an AI model for a given CNN may include the weights, biases, and other parameters for one or more convolutional layers of the CNN. Here, the weights and parameters of an AI model are interchangeable.

Examples of an "image application" or "image task" include applications requiring processing of image pixels, such as image recognition, image classification, image enhancement, image object detection, face detection, color restoration, video surveillance and other applications. In other examples, an image application may also include a voice processing or recognition application in which audio signals are converted to two-dimensional (2D) images, e.g., spectrograms, for 2D image processing.

Examples of an "AI task" may include image recognition, voice recognition, object recognition, data processing and analyzing, or any recognition, classification, processing tasks that employ artificial intelligence technologies.

Figure 1:
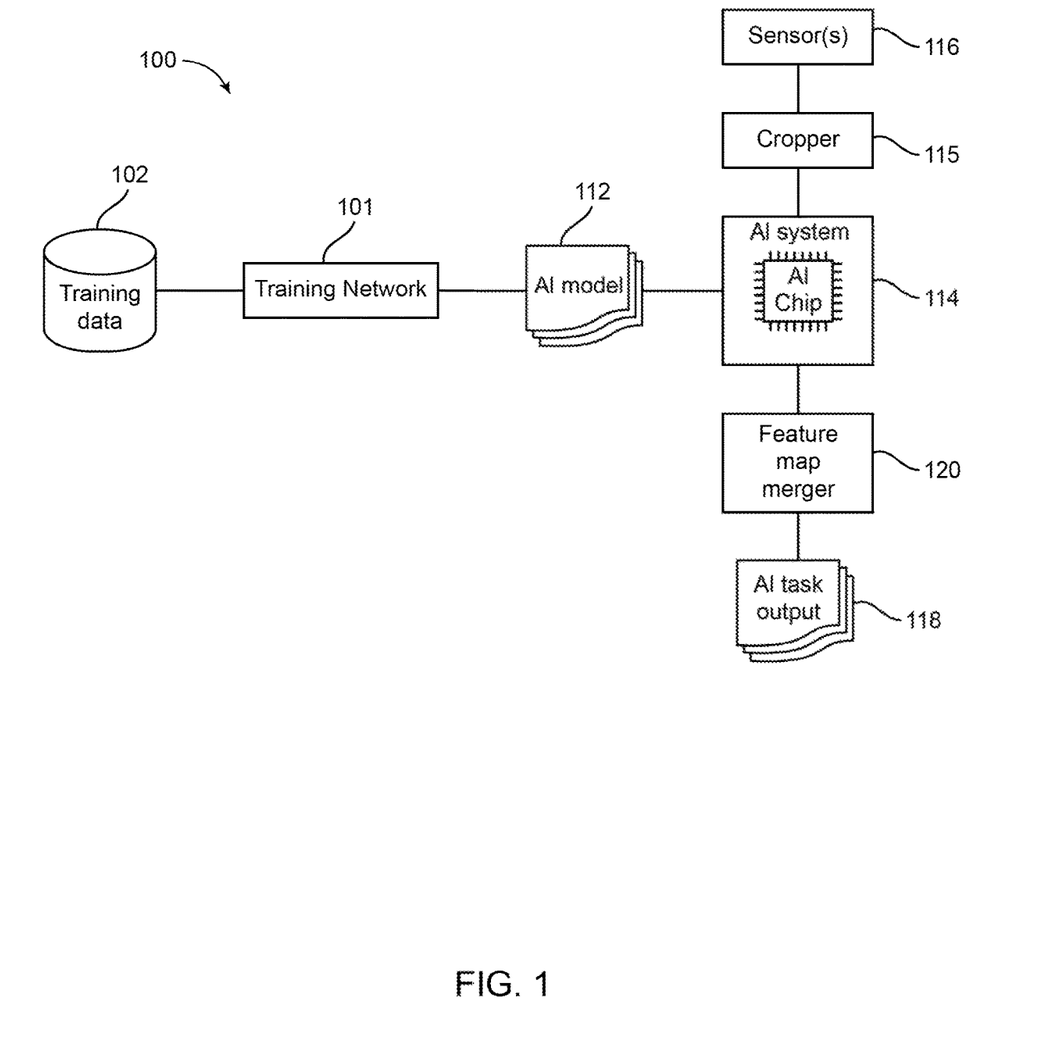
FIG. 1 illustrates an example system in accordance with various examples described herein.

FIG. 1 illustrates an example system in accordance with various examples described herein. In some example, a system 100 may include a training network 101 configured to train an AI model 112. The AI model 112 may be uploaded to an AI chip in an AI system 114. In some examples, the AI model may include a CNN configured to perform AI tasks. A CNN may include multiple convolutional layers, each of which may include multiple parameters, such as weights and/or other parameters. In such case, an AI model may include parameters of the CNN model. In some examples, a CNN model may include weights, such as a mask and a scalar for a given layer of the CNN model. For example, a kernel in a CNN layer may be represented by a mask that has multiple values in lower precision multiplied by a scalar in higher precision. In some examples, a CNN model may include other parameters. For example, a CNN layer may include one or more bias values that, when added to the output of the output channel, adjust the output values to a desired range.

In a non-limiting example, in a CNN model, a computation in a given layer in the CNN may be expressed by $Y=W*X+b$, where X is input data, Y is output data, W is a kernel, and b is a bias; all variables are relative to the given layer. Both the input data and the output data may have a number of channels. Operation "*" is a convolution. Kernel W may include weights. For example, a kernel may include 9 cells in a 3×3 mask, where each cell may have a binary value, such as "1" and "−1." In such case, a kernel may be expressed by multiple binary values in the 3×3 mask multiplied by a scalar. In other examples, for some or all kernels, each cell may be a signed 2- or 8-bit integer. Alternatively, and/or additionally, a kernel may contain data with non-binary values, such as 7-value. Other bit length or values may also be possible. The scalar may include a value having a bit width, such as 12-bit or 16-bit. Other bit length may also be possible. The bias h may contain a value having multiple bits, such as 18-bits. Other bit length or values may also be possible. In a non-limiting example, the output Y may be further discretized into a signed 5-bit or 10-bit integer. Other bit length or values may also be possible.

In some examples, the AI chip in the AI system 114 may include an embedded cellular neural network that has memory containing the multiple parameters in the CNN. In some scenarios, the memory in an AI chip may be a one-time-programmable (OTP) memory that allows a user to load a CNN model into the physical AI chip once. Alternatively, the AI chip may have a random access memory (RAM), magneto-resistive random access memory (MRAM), or other types of memory that allows a user to update and load a CNN model into the physical AI chip multiple times. In a non-limiting example, the AI chip may include one or more layers of a CNN model. Additionally, the AI chip may include one or more pooling layers. The output of a pooling layer may include a feature map. Multiple pooling layers may subsequently provide multiple feature maps, each having a different size. In some examples, the AI chip may include multiple convolution layers, pooling layers and/or activation layers in a CNN model. In such case, the AI chip may be configured to perform an AI task. In other examples, the AI chip may include a subset of the convolution, pooling, and activation layers in a CNN model. In such case, the AI chip may perform certain computations in an AI task, leaving the remaining computations in the AI task performed in a CPU/GPU or other host processors outside the AI chip.

With further reference to FIG. 1, in some examples, the training network 101 may be configured to include a forward propagation neural network, in which information may flow from the input layer to one or more pooling layers of the AI model and to the output layer to infer the output of the AI model. The training network 101 may also be configured to include a backward propagation network to update the weights of the AI model based on the inferred output of the AI model. In some examples, the training network may include a combination of forward and backward propagation networks.

In some examples, the training network 101 may be configured to access training data 102 for use in training the AI model 112. For example, training data 102 may be used for training an AI model that is suitable for image segmentation tasks, and the training data may contain any suitable dataset collected for performing image segmentation tasks. In another example, the training data may be used for training an AI model suitable for object recognition in images, and thus the training data may also contain a suitable dataset collected for object recognition. In the above examples, the training data 102 may include ground truth data indicating the correct result of image segmentation or object recognition. In some scenarios, training data may reside in a memory in a host device. In one or more other scenarios, training data may reside in a central data repository and is available for access by the training network 101 via a communication network. Details of the training network 101 will be further described with reference to FIG. 5.

In some examples, the training network 101 may include a floating-point model training system 104, which may be configured to train an AI model, e.g., a CNN model using one or more sets of training data 102. For example, the floating-point model training system may be implemented on a desktop computer (CPU, and/or GPU) in floating point, in which one or more weights of the CNN model are in floating point. Any known or later developed methods may be used to train a CNN model. The training system 100 may further include one or more systems to convert the floating-point model to a hardware-supported model, as further illustrated in FIG. 1. For example, the float-point weights in a CNN model may be quantized to a suitable number of bits constrained by the hardware.

With further reference to FIG. 1, the system 100 may include one or more sensors 116. The sensor(s) 116 may be configured to capture various types of data, such as image, video, audio, text, or any information in various media formats. The system 100 may also include a cropper 115 coupled to the sensor(s) 116. The cropper 115 may be configured to receive captured data from the sensor(s) 116, such as one or more images or a sequence of images in a video. The cropper 115 may be configured to crop the captured images to provide the cropped images to the AI system 114. In a non-limiting example, the cropper 115 may crop an image into multiple cropped images according to a cropping pattern, where each of the cropped images may be a subset of the image being cropped.

With further reference to FIG. 1, the AI system 114 may be configured to perform an AI task in the AI chip based on the cropped images from the cropper 115, and generate feature maps from the cropped images. The system 100 may further include a feature map merger 120 coupled to the AI system 114 and configured to combine feature maps of multiple cropped images to generate the AI task output 118. In some examples, the feature maps of the multiple cropped images may be obtained at the output of a pooling layer of the AI model. In some examples, the feature maps may be contained in an activation layer (e.g., a ReLU layer) of the AI model. The feature map for each of the cropped images may include a two-dimension (2D) array per channel of multiple channels. For example, a feature map may include 1024 channels, each containing 8-bits for each pixel. In some examples, the feature map merger 120 may combine the feature maps of multiple cropped images according to a merging pattern. The merging pattern may be the same as the cropping pattern.

In some scenarios, the AI chip in the AI system 114 may contain an AI model, e.g., a CNN, for performing certain AI tasks. Executing an AI chip or an AI model may include configuring the AI chip to perform an AI task based on the AI model inside the AI chip and generate an output. An example of an AI system, such as a camera having a built-in AI chip, is described in the present disclosure. Now, the training network 101 is further described in detail with reference to FIGS. 2-5.

Figure 2:
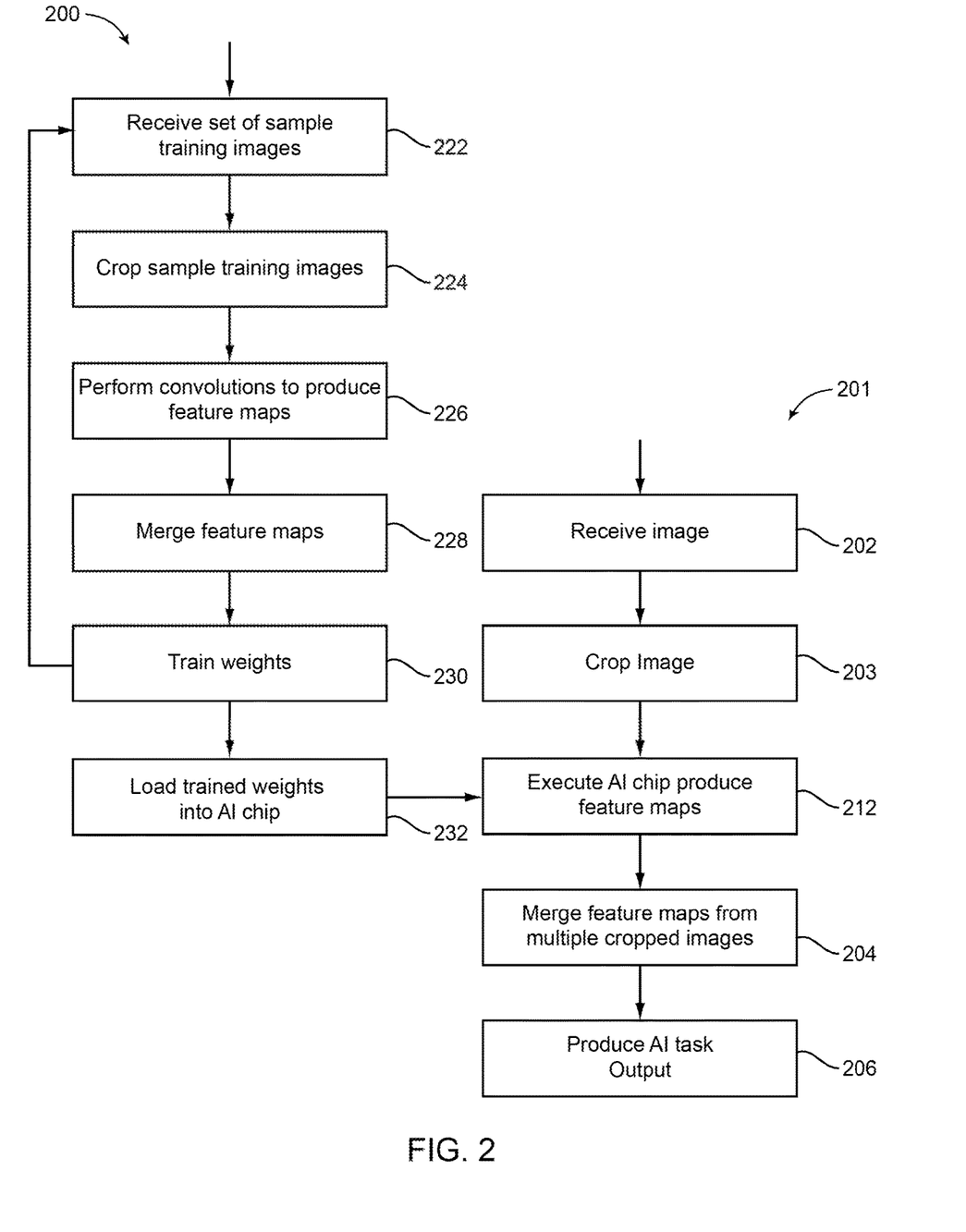
FIG. 2 illustrates an example of a process for performing an image task in an AI chip and training a convolution neural network for such task in accordance with various examples described herein.

FIG. 2 illustrates an example of a process for implementing an image task in an AI chip and training a convolution neural network for such task in accordance with various examples described herein. A process 200 may be implemented to train and load weights of an AI model into an AI integrated circuit (i.e. a chip) for performing various AI tasks. In some examples, the process 200 may be implemented in a training network (e.g., 101 in FIG. 1). In some scenarios, a training method may include: receiving a set of sample training images at 222, and cropping the sample training images at 224. In some examples, cropping the sample training images may be performed according to a cropping pattern.

Figure 4A:
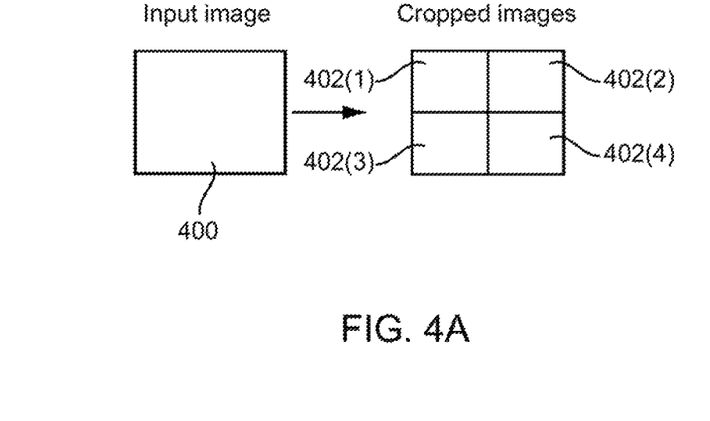
FIGS. 4A and 4B illustrate examples of patterns for implementing cropping operations in accordance with various examples described herein.
Figure 4B:
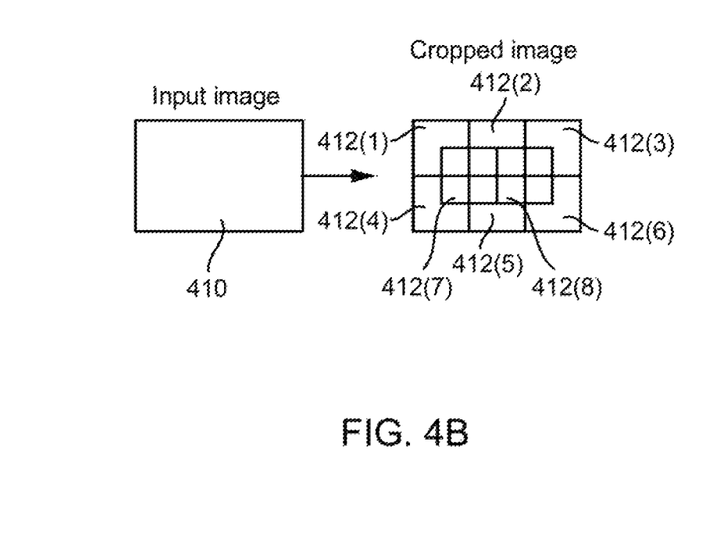

FIGS. 4A and 4B illustrate examples of cropping patterns that may be implemented in a cropping operation in accordance with various examples described herein. In some examples, these patterns may be implemented in the cropper (115) and the cropping operation 224 (in FIG. 2). With reference to FIG. 4A, according to a cropping pattern, an input image 400 may be cropped by equally dividing the input image into four quadrants, such as top-left 402(1), top-right 402(2), bottom-left 402(3) and bottom-right 402(4). In a non-limiting example, an input image having the size of 448×448 may be cropped into four images by dividing the input image into four equal size quadrants, each having the size of 224×224.

FIG. 4B illustrates another example pattern that may be implemented in a cropping operation. As shown in FIG. 4B, an input image 410 may be cropped by equally dividing the image into two rows, each row equally divided into three regions. This results in six equal size regions, namely 412(1)-412(6). Additionally, the input image 410 may be cropped into two additional regions 412(7), 412(8), each overlapping with one or more other cropped images. For example, cropped image 412(7) also overlaps the common corner and common edges of regions 412(1), 412(2), 412(4) and 412(5). Similarly, the cropped image 412(8) overlaps the common corner and common edges of regions 412(2), 412(3), 412(5) and 412(6).

Returning to FIG. 2, the training process 200 may infer the output of the AI model at 226 by performing convolutions to produce the feature maps, based on the cropped images and the weights in the AI model. In some examples, the AI model may include a CNN having multiple convolution layers. The weights of the AI model may include kernels and scalars for each of the multiple convolution layers. In some examples, the process 200 may additionally include initializing training weights of the AI model. For example, the process 200 may randomly assign values to the weights of the AI model. In other examples, the process 200 may include implementing a conventional floating-point model training system to obtain initial weights of the AI model. In the inferring process at 226, the output of each convolution layer in the AI model may be inferred by convolution operations of each layer using respective weights and propagating the sample training images through the AI model layer by layer. This is further described with reference to FIG. 3.

Figure 3:
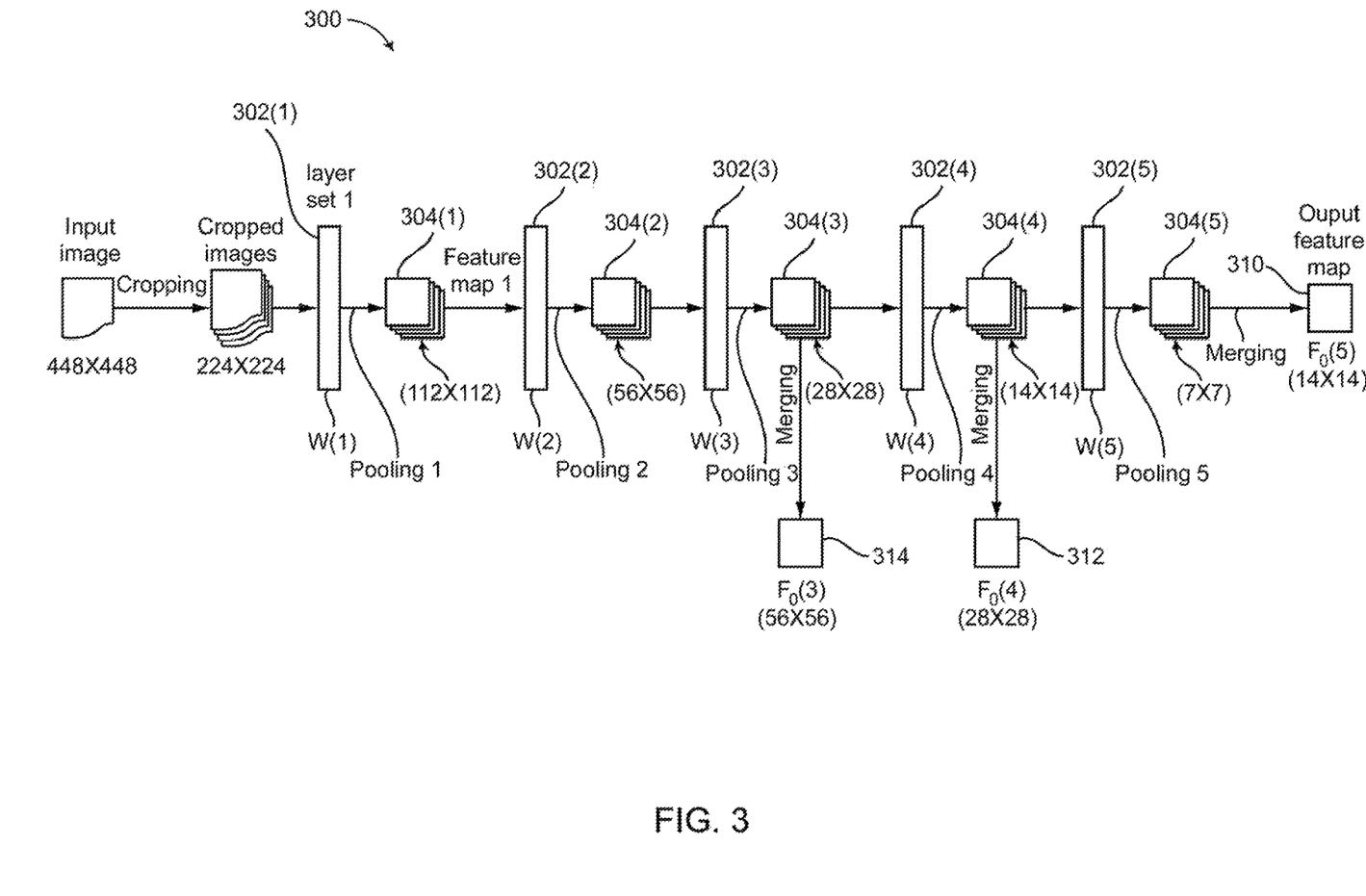
FIG. 3 is a schematic diagram of a portion of an example CNN in which one or more embodiments of the disclosure may be implemented in accordance with various examples described herein.

FIG. 3 is a schematic diagram of a portion of an example CNN in which one or more embodiments of the disclosure may be implemented in accordance with various examples described herein. In some examples, a CNN 300 may be included in an AI model (112 in FIG. 1) and implemented in an AI chip (114 in FIG. 1). In some examples, the CNN 300 may be used in performing the convolutions in operation 226 (in FIG. 2). In the example CNN 300 in FIG. 3, there may be multiple convolution layer sets 302(1), 302(2), . . . 302(5). Each of the multiple convolution layer sets 302 may include respective weights, such as W(1), W(2), . . . W(5). In some examples, each convolution layer set may include one or more convolution layers. For example, in a VGG16 implementation, the first convolution layer set 302(1) may include two convolution layers. In such case, the weights W(1) may contain the weights for the two convolution layers in the first convolution layer set 302(1). Similarly, in the VGG 16 example, the subsequent convolution layer sets 302(2), 302(3), 302(4) and 302(5) may include two, three, three and three convolution layers, respectively. In this example, the total number of convolution layers in the multiple convolution layer sets is 13. In such case, the weights W(2), W(3), W(4) and W(5) may each contain weights for the two, three, three and three convolution layers in each corresponding convolution layer set.

With further reference to FIG. 3, the CNN 300 may further include multiple pooling layers, e.g., poolings 1-5 coupled to the output of respective convolution layer sets, such as 302(1)-302(5). For example, the pooling layer, pooling 1 may be disposed at the output of the first convolution layer set 302(1) and before the input of the second convolution layer set 302(2). The pooling layer, pooling 2 may be disposed at the output of the convolution layer set 302(2) and before the input of the convolution layer set 302(3). The pooling layer, pooling 5 may be coupled to the output of the convolution layer set 302(5).

With further reference to FIG. 3, performing convolutions in a CNN, such as operation 226 in FIG. 2, may include performing convolutions in the multiple convolution layer sets 302(1)-302(5) based on the cropped images. In a non-limiting example, the input of the first convolution layer set 302(1) may receive a cropped image at the input and perform a convolution operation using the weights W(1) in that convolution layer set over the pixels of the cropped image. In some examples, a convolution layer may include an activation layer (e.g., a ReLU layer) configured to convert the output of the convolution layer to a bit size suitable for the input of the next convolution layer. For example, whereas the convolution output may have positive values or negative values, the activation layer may convert the output to positive values by setting negative values to zero. The output of the activation layer in a convolution layer may contain a feature map, which is provided to the next convolution layer. In some examples, each of the pooling layers, e.g., poolings 1-5 may provide a respective feature map at the output, e.g., 304(l)—(5). The sizes of the feature maps of pooling layers may decrease by each pooling layer until the last pooling layer, which generates the feature map with the smallest size.

In the above VGG example, the AI model may include a VGG16 model. The VGG16 includes 13 convolution layers and multiple pooling layers. In a non-limiting example, the input image for the VGG16 has a size of 448×448, and is cropped (e.g., in operation 224 in FIG. 2 or cropper 115 in FIG. 1) to multiple images. According to the cropping pattern in FIG. 4A, the cropped images each may have a size of 224×224.

With further reference to FIG. 3, in some examples, each of the cropped images may be provided to the first convolution layer set 302(1) to produce a feature map 304(1) at the first pooling layer, pooling 1. In some example, the first convolution layer may have a size of 224×224. The weights W(1) contain the weights for the first convolution layer set 302(1). The feature map provided by the first pooling layer pooling 1 may have a size of 112×112. Similarly, the feature map 304(2) provided by the second pooling layer, pooling 2 may have a size of 56x56. The feature maps 304(3)—(5) of the third, fourth and fifth pooling layers, poolings 3, 4 and 5 may each have the size of 28×28, 14×14 and 7×7, respectively.

Figure 4C:
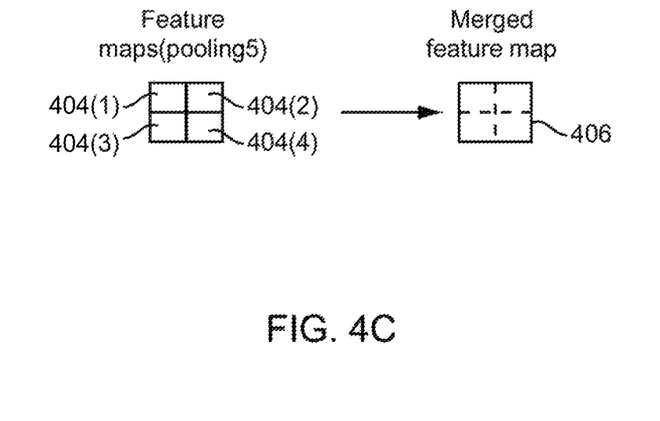
FIGS. 4C and 4D illustrate examples of patterns for implementing merging operations in accordance with various examples described herein.
Figure 4D:
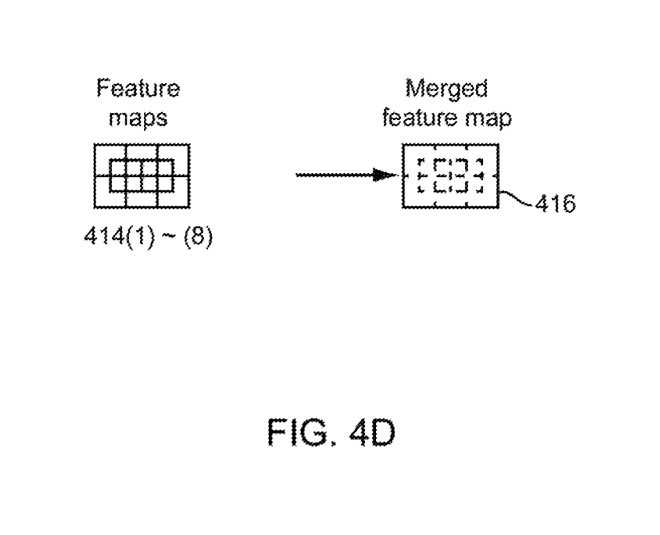

Returning to FIG. 2, the training process 200 may further include merging feature maps of multiple cropped images at 228. Now, with reference to the example CNN in FIG. 3, each of the cropped images may be provided to the CNN 300 to produce a respective feature map 304(5) at the output of the final pooling layer, pooling 5. As illustrated above, the size of the feature map 304(5) for each cropped image is 7×7. In merging the feature maps at operation 228 (in FIG. 2), the feature maps of the multiple cropped images are merged to form a larger feature map according to a merging pattern. In some examples, the merging pattern is the same as the cropping pattern used in cropping the input images. For example, the merging pattern may be patterns shown in FIGS. 4C and 4D. FIG. 4C corresponds to the cropping pattern in FIG. 4A. For example, the feature maps 404(1)—(4) are arranged in the same manner as the four cropped images 402(1)—(4) are cropped from the larger image 400, to form the merged feature map 406. In another non-limiting example, FIG. 4D corresponds to the cropping pattern in FIG. 4B. For example, the 8 feature maps 414(1)—(8) are arranged in the same manner as the 8 cropped images 412(1)—(8) are cropped from the larger image 410, to form the merged feature map 416. Various cropping and merging patterns may be possible. In the above example, when the feature map has a size of 7×7, the merged feature map according to the pattern shown in FIG. 4A is 14×14.

Returning to FIG. 2, the training process 200 may further include training weights at 230 from the merged feature maps. This process may be an iterative process. In each iteration, the process may process a new sample training image or a new set of sample training images. Various training methods may be implemented to update the weights of the CNN. This will be further described in FIG. 5. Once the trained weights are obtained for the CNN model, the training process 200 further load the training weights into the AI chip at 232. The AI chip may be included in the AI system 114 (in FIG. 1), for example.

With further reference to FIG. 2, an AI task may be implemented in a process 201. In some examples, the process 201 may be implemented in the AI system 114 (FIG. 1). For example, once the training weights are loaded into the AI chip in the AI system 114 (FIG. 1), the process 201 may be implemented in the AI system 114 (FIG. 1) to receive image(s) at 202. The image(s) may be captured from an image sensor(s) (e.g., 116 in FIG. 1). The process 201 may further crop the image(s) according to a cropping pattern at 203. In some examples, the images may be cropped in the same manner as sample training images are cropped (e.g., 224), such as the cropping patterns shown in FIGS. 4A and 4B.

The process 201 may further include executing the AI chip to produce feature maps at 212. The feature maps may be produced by the AI chip based on the cropped images from operation 203 and the trained weights. In some examples, the trained weights are obtained from a training process, such as process 200. For a given input image, multiple cropped images are produced at 203. Each of the cropped images may be provided to the AI chip to produce a feature map. As such, multiple feature maps are produced, each corresponding to a cropped image.

With further reference to FIG. 2, the process 201 may further merge the feature maps at 204. In some examples, the feature maps may be merged in a similar manner as merging feature maps at 228 during a training process, which is explained with examples shown in FIGS. 4C and 4D. In other words, the merging of feature maps in the training of the AI model and the merging of feature maps in performing the AI tasks are performed in the same manner in order for the training to be meaningful. The process 201 may use the merged feature maps from operation 204 to produce the AI task output at 206. In some examples, the process 201 may generate the output image, where the size of the output image may be larger than that of the cropped images from 203. This results in an improved performance in an AI task such as object recognition and image segmentation because the merged output image now contains more details of image features.

The above described merging methods (e.g., 204) may be applied to various configuration of the AI chip. For example, with reference to FIG. 3, the merge operation 204 (in FIG. 2) may be performed on the feature maps 304(5) from the pooling 5 layer to generate merged feature map Fo(5). Additionally, and/or alternatively, the merge operation may be performed on feature maps 304(4) from the pooling 4 layer to generate merged feature map Fo(4). Additionally, and/or alternatively, the merge operation may be performed on feature maps 304(3) from the pooling 3 layer to generate merged feature map Fo(3). In other variations, the merged feature maps Fo(3), Fo(4), Fo(5) and/or combination thereof may be used for further image processing such as image segmentation or objection recognition.

Returning to FIG. 2, in some examples, merging the feature maps at 204 may be performed inside the AI chip or outside the AI chip. For example, the feature maps provided at the output of the pooling 3, pooling 4 or pooling 5 layers of the AI chip may be accessed by a processing device from outside the AI chip (e.g., via a peripheral or communication link), whereas the processing device may subsequently merge the feature maps to produce the output result. Conversely, combining the feature maps from one or more pooling layers may be implemented inside the AI chip having a processor. In some examples, producing the AI task output at 206 may include storing a digital representation of the output image to a memory device inside the AI chip or outside the AI chip, the content of the memory can be retrieved by an application running the AI task, an external device or a process. The application may run on a processor external to the AI chip, such as a computing device or a server on the cloud, which may be electrically coupled to or may communicate remotely with the AI chip. Alternatively, and/or additionally, the AI chip may transmit the AI task result to a processor running the AI application or a display. In some examples, the input images may be stored in a local memory or in a remote database. In such case, receiving the image at 202 may include accessing the input image from a memory. The memory may be in a local storage or on a remote server.

Figure 5:
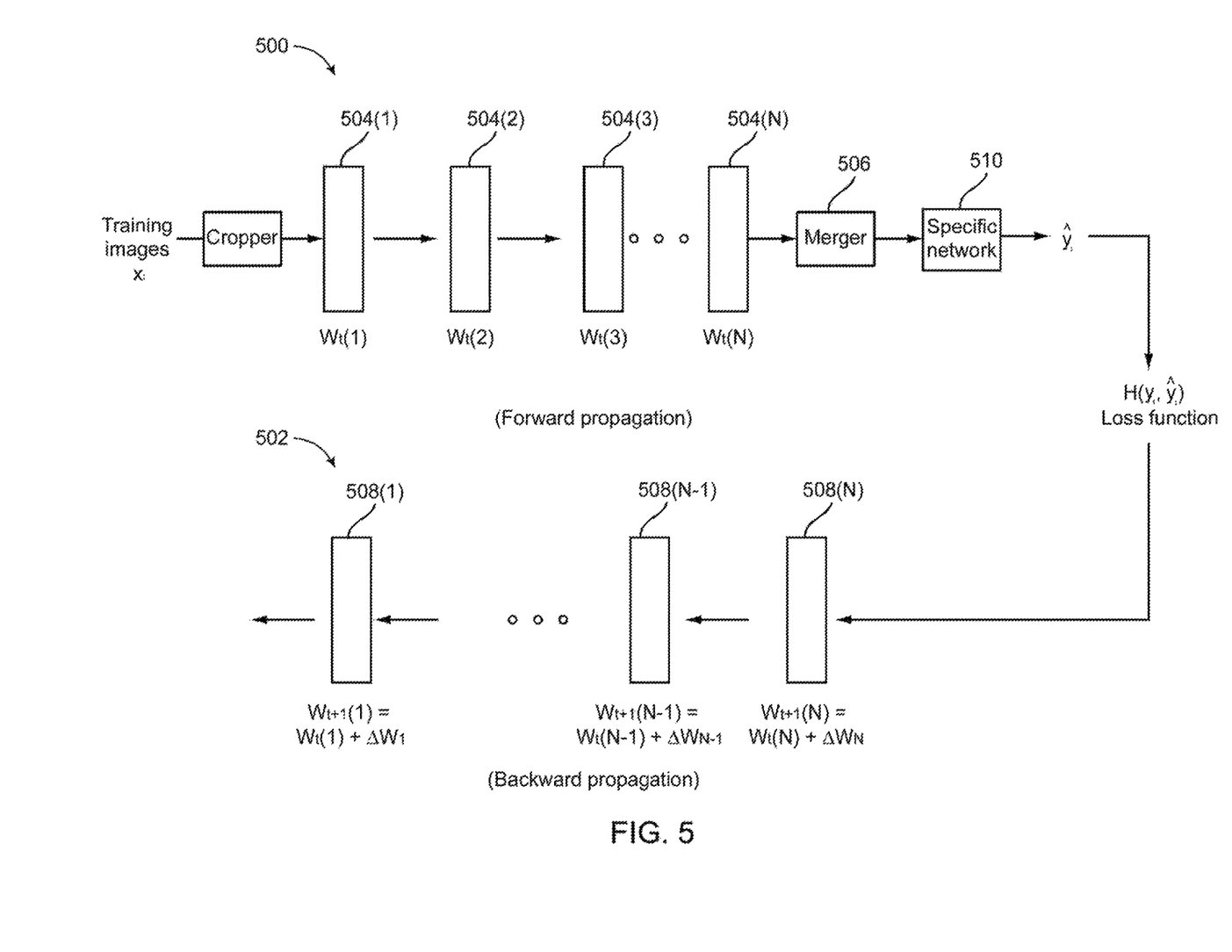
FIG. 5 illustrates flow diagrams of example forward and backward-propagation processes in training a CNN model in accordance with various examples described herein.

FIG. 5 illustrates flow diagrams of example forward and backward-propagation methods used in training a CNN model in accordance with various examples described herein. In some examples, a forward propagation network 500 and a backward propagation network 502 may be implemented in a training process such as 200 in FIG. 2, or 101 in FIG. 1. In the example in FIG. 5, the forward propagation network 500 includes providing cropped images from the training images to the input of the first convolution layer, e.g., 504(1) of the CNN model. The cropped images may be generated by a process, such as operation 224 (in FIG. 2) or a cropper, such as the cropper 115 (in FIG. 1). As shown in FIG. 5, in a forward propagation network 500, the cropped images are provided through the multiple convolution layers 504(1)-(N) in which the inference of the CNN model is propagated from the first convolution layer to the last convolution layer in the CNN (or a subset of the convolution layers in the CNN).

In some examples, the output from the convolution layers may include multiple feature maps, each corresponding to a cropped image of the multiple cropped images. In a previous example, a training sample image $x_i$, may have a size of 448×448. According to a cropping pattern, e.g., the cropping pattern in FIG. 4a, each of the cropped images may have a size of 224×224, and the output feature map from the last convolution layer of a VGG16 may have the size of 7×7. The forward propagation network 500 may further include a merger 506 configured to merge the output feature maps. The merger 506 may be configured to merge multiple feature maps in the same manner as described above with reference to FIGS. 1-4. The merging operation in the merger 506 may also be performed according to the same merging pattern as described above with reference to FIGS. 4C and 4D. In the above example, the merged output feature map may have an enlarged size of 14×14. The forward propagation network 500 may further include a specific network 510 configured to produce an output $\hat{y}_i$.

With further reference to FIG. 5, in a backward propagation network 502, a gradient descent method may be used. In some examples, each of the convolution layers of the CNN model may be updated based on a change of weights. For example, the change of weights may be determined as a function of a loss function $H(y_i, \hat{y}_i)$, where $H(\ )$ is the loss function, $y_i$, is the ground truth of the input image $x_i$, and $\hat{y}_i$, is the inferred output from the CNN model in the forward propagation. In some examples, in an image segmentation application, the ground truth data may include information about the correct image segmentation results. For example, the image segmentation result may be represented by various regions in the image to have pixels of different values to represent different regions. In another example, in an object recognition application, the ground truth may contain one or more objects in the image, or information about whether the image contains a class of objects, such as a cat, a dog, a human face, or a given person's face.

Inferring the AI model in an image recognition task may include generating a recognition result indicating which class to which the input image belongs. In other examples, ground truth data may include pixel values. Inferring the output from the CNN model may include generating an output image having pixel values that can be compared against the pixel values in the ground truth data. For example, the size of the ground truth $y_i$ may be the same as the size of the input image $x_i$. The specific network 510 may be configured to upscale the merged feature map so that the output $\hat{y}_i$ become the same size of the input image to be able to be compared with the ground truth.

In the backward propagation, a change of weight ΔW for a convolution layer is determined based on the loss function and used to update the weights in that convolution layer, such that the updated weights at time t+1 may be $W_{t+1}(n)=W_t(N)+\Delta W_N$, where N is the convolution layer N and $\Delta W_N$ is the change of weights for that convolution layer. In the backward propagation network 502, the change of weights for a layer may be determined based on the error of the previous layer, which corresponds to the succeeding layer in the forward propagation. For example, $\Delta W_{N-1}$ may be determined based on the error of the convolution layer N, where the error may be based on the inference (output) of layer N. The remaining layers in the CNN processing block may be updated in a similar manner. In some examples, the forward propagation network 500 and the backward propagation network 502 may be implemented together in various training schemes, such as gradient descent. In a non-limiting example, a stochastic gradient descent (SGD) method may be used to determine the change of weights. This operation can be performed on a layer by layer basis.

In some examples, in the SGD method, a stopping criteria may be used. If the stopping criteria has not been met, operations in the forward propagation network 500 and the backward propagation network 502 in the training process may be repeated in one or more iterations until the stopping criteria is met. In determining whether a stopping criteria is met, the training process may count the number of iterations and determine whether the number of iterations has exceeded a maximum iteration number. For example, the maximum iteration may be set to a suitable number, such as 100, 200, or 1000, or 10,000, or an empirical number. In some examples, determining whether a stopping criteria is met may also determine whether the value of the loss function at the current iteration is greater than the value of the loss function at a preceding iteration. If the value of the loss function increases, the training process may determine that the iterations are diverting and determine to stop the iterations. Alternatively, and/or additionally, if the iterations are diverting, the training process may adjust the gradient descent hyper-parameters, such as learning rate, batch size, gradient decent updating mechanism, etc. In some examples, if the value of the loss function does not decrease over a number of iterations, the training process may also determine that the stopping criteria is met.

In the above example, because the training sample images are cropped to multiple images of a smaller size, the smaller size CNN model may be used to accommodate a larger size image. In the above example, training sample images having a size of 448×448 may be used to train weights of 244×244 CNN model, which can be uploaded into an AI chip. Thus, a smaller size AI chip may be used. Similarly, as shown in FIG. 3, the feature maps of the CNN model may be merged to form a larger feature map with a higher resolution image, thus the result of the AI task can be enhanced. Using the cropping and merging operations described herein on the above example image size, both input and output images may have a size of 448×448, whereas the CNN model may have a size of 224×224. In other words, a smaller size CNN may be used to process a larger size image.

Figure 6:
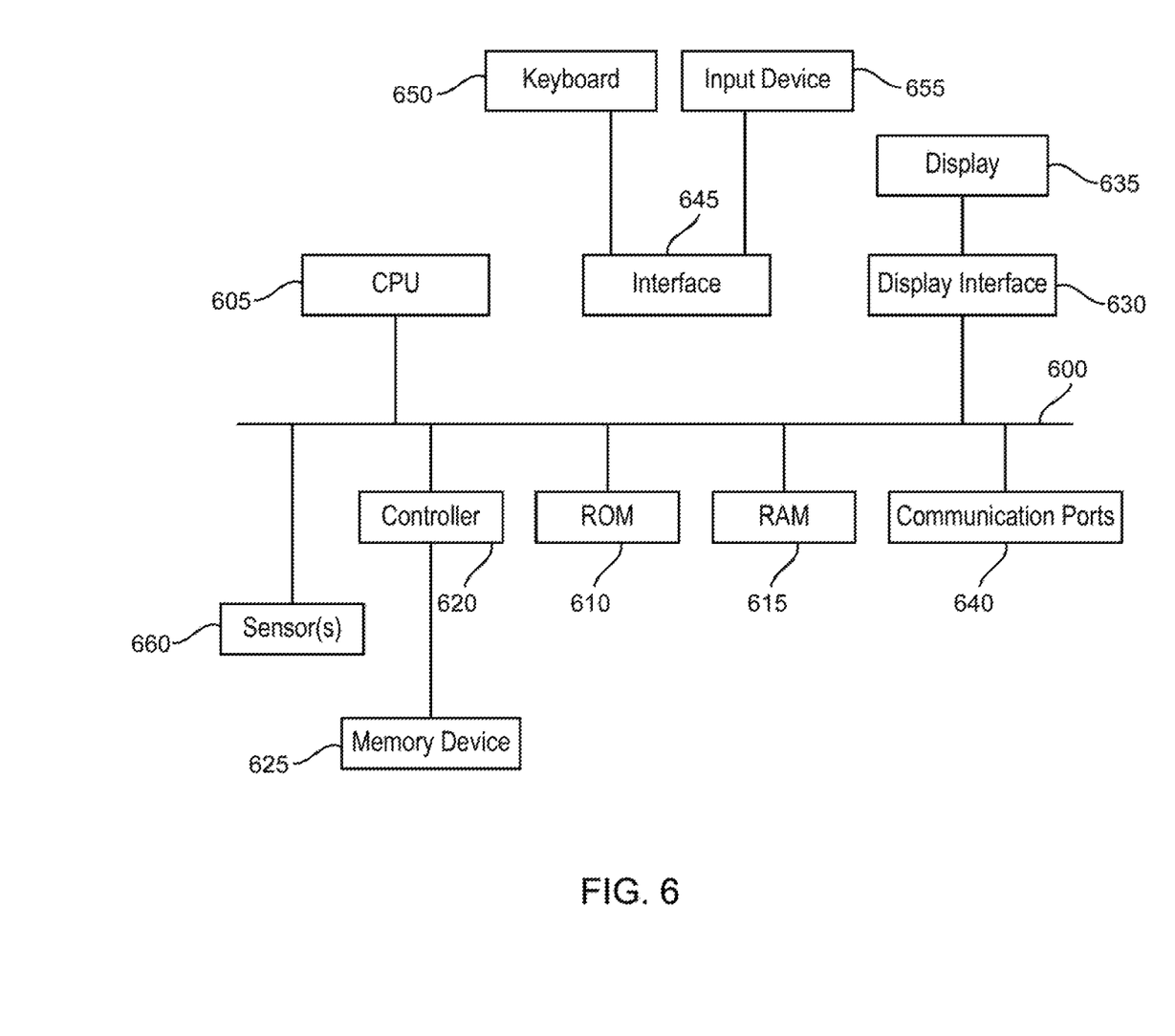
FIG. 6 illustrates various embodiments of one or more electronic devices for implementing the various methods and processes described herein.

FIG. 6 illustrates an example of internal hardware that may be included in any electronic device or computing system for implementing various methods in the embodiments described in FIGS. 1-5. An electrical bus 600 serves as an information highway interconnecting the other illustrated components of the hardware. Processor 605 is a central processing device of the system, configured to perform calculations and logic operations required to execute programming instructions. As used in this document and in the claims, the terms "processor" and "processing device" may refer to a single processor or any number of processors in a set of processors that collectively perform a process, whether a central processing unit (CPU) or a graphics processing unit (GPU) or a combination of the two. Read only memory (ROM), random access memory (RAM), flash memory, hard drives, and other devices capable of storing electronic data constitute examples of memory devices 625. A memory device, also referred to as a computer-readable medium, may include a single device or a collection of devices across which data and/or instructions are stored.

An optional display interface 630 may permit information from the bus 600 to be displayed on a display device 635 in visual, graphic, or alphanumeric format. An audio interface and audio output (such as a speaker) also may be provided. Communication with external devices may occur using various communication ports 640 such as a transmitter and/or receiver, antenna, an RFID tag and/or short-range, or near-field communication circuitry. A communication port 640 may be attached to a communications network, such as the Internet, a local area network, or a cellular telephone data network.

The hardware may also include a user interface sensor 645 that allows for receipt of data from input devices 650 such as a keyboard, a mouse, a joystick, a touchscreen, a remote control, a pointing device, a video input device, and/or an audio input device, such as a microphone. Digital image frames may also be received from an imaging capturing device 655 such as a video or camera that can either be built-in or external to the system. Other environmental sensors 660, such as a GPS system and/or a temperature sensor, may be installed on system and communicatively accessible by the processor 605, either directly or via the communication ports 640. The communication ports 640 may also communicate with the AI chip to upload or retrieve data to/from the chip. For example, a trained AI model with updated weights obtained from the training system 100 (FIG. 1), or the processes 200 (FIG. 2) may be shared by one or more processing devices on the network running other training processes or AI applications. For example, a device on the network may receive the trained AI model from the network and upload the trained weights, to an AI system (e.g., 114 in FIG. 1) for performing an AI task via the communication port 640 and an SDK (software development kit). The communication port 640 may also communicate with any other interface circuit or device that is designed for communicating with an integrated circuit.

Optionally, the hardware may not need to include a memory, but instead programming instructions are run on one or more virtual machines or one or more containers on a cloud. For example, the various methods illustrated above may be implemented by a server on a cloud that includes multiple virtual machines, each virtual machine having an operating system, a virtual disk, virtual network and applications, and the programming instructions for implementing various functions in the robotic system may be stored on one or more of those virtual machines on the cloud.

Various embodiments described above may be implemented and adapted to various applications. For example, the AI chip having a CNN architecture may be residing in an electronic mobile device. The electronic mobile device may capture an image of the environment, and use the built-in AI chip to perform image segmentation. In such scenario, the image segmentation produces the results at a higher resolution than without merging the feature maps. FIGS. 4A-4D merely show example cropping and merging patterns. In other variations, by cropping an image into more ore fewer cropped images, the ratio of the merged image size over the cropped image size may be higher or lower. For example, an image of size of 512×512 may be cropped into multiple images having a size of 224×224. Conversely, an image of size of 396×396 may also be cropped into multiple images having the size of 224×224. These variation result in various improvement of image resolution.

In some scenarios, training the CNN model can be performed in the mobile device itself, where the mobile device retrieves training data from a dataset and uses the built-in AI chip to perform the training. In other scenarios, the processing device may be a server device in the communication network (e.g., 102 in FIG. 1) or may be on the cloud. These are only examples of applications in which an AI task can be performed in the AI chip.

The various systems and methods disclosed in this patent document provide advantages over the prior art, whether implemented standalone or combined. For example, using the systems and methods described in FIGS. 1-6, a hardware-constraint AI chip may be configured to process an image in a higher resolution. For example, in a conventional VGG network having the CNN model size of 224×224 may accommodate an input image of 224×224, and produce the output feature map having a size of 7×7. Now, using the cropping and merging schemes described in the present disclosure, the VGG network of the same CNN model size of 224×224 may accommodate an input image of 448×448 and produce the output feature map having a size of 14×14, which reveals much more details of the image, which results in an improvement of image segmentation or other image processing operations. In other words, an improvement of image processing operations is made available via using of larger images without increasing the hardware requirement or the number of parameters in the CNN model.

It will be readily understood that the components of the present solution as generally described herein and illustrated in the appended figures could be arranged and designed in a wide variety of different configurations. For example, although it is illustrated to combine multiple feature maps from the multiple cropped images, any number of feature maps may be merged. In a non-limiting example, only a subset of cropped image may be used for merging feature maps. For example, whereas cropping generates 8 cropped images, 4 cropped images may be used. Similarly, the cropping pattern and the merging pattern may be different. Whereas the cropping pattern for training and for performing the AI task are typically the same, there may be variations. For example, the cropping pattern for training and that for performing the AI task may be different. Similarly, the merging pattern for training and that for performing the AI task may also be the same, or different. Thus, the detailed description of various implementations, as represented herein and in the figures, is not intended to limit the scope of the present disclosure, but is merely representative of various implementations. While the various aspects of the present solution are presented in drawings, the drawings are not necessarily drawn to scale unless specifically indicated.

Other advantages can be apparent to those skilled in the art from the foregoing specification. Accordingly, it will be recognized by those skilled in the art that changes, modifications, or combinations may be made to the above-described embodiments without departing from the broad inventive concepts of the invention. It should therefore be understood that the present solution is not limited to the particular embodiments described herein, but is intended to include all changes, modifications, and all combinations of various embodiments that are within the scope and spirit of the invention as defined in the claims.

We claim:

1. A system comprising:
    a processor;
    an artificial intelligence (AI) chip coupled to the processor; and
    a non-transitory computer readable medium containing programming instructions that, when executed, will cause the processor to:
        receive an input image;
        crop the input image into a plurality of cropped images;
        executing the AI chip to produce a plurality of feature maps based on at least a subset of the plurality of cropped images;
        merge at least a subset of the plurality of feature maps to form a merged feature map; and
        produce an output image based on the merged feature map.

2. The system of claim 1, wherein the instructions for cropping the input image are configured to crop the input image according to a first pattern, and wherein the instructions for merging the subset of the plurality of feature maps are configured to merge the subset of the plurality of feature maps also according to the first pattern.

3. The system of claim 1, wherein the AI chip contains a convolution neural network (CNN) model having a size lower than a size of the input image and also lower than a size of the output image.

4. The system of claim 3 further comprising a training network configured to train weights of the CNN model in the AI chip by:
receiving a sample training image;
cropping the sample training image to a plurality of cropped sample images;
performing convolutions over at least a subset of the plurality of cropped sample images based on the weights of the CNN model to produce a plurality of training feature maps;
merging at least a subset of the plurality of training feature maps to produce a merged training feature map;
in one or more iterations, updating the weights of the CNN model based on the merged training feature map by repeating the operations of performing convolutions and merging; and
loading the weights of the CNN model into the AI chip.

5. The system of claim 4, wherein the input image is cropped in a first pattern and the sample training image is cropped also in the first pattern, and wherein the subset of the plurality of feature maps are merged in a second pattern and the subset of the plurality of training feature maps are merged also in the second pattern.

6. The system of claim 5, wherein the first pattern and the second pattern are the same.

7. A method comprising:
receiving an input image;
cropping the input image into a plurality of cropped images;
executing an AI chip to produce a plurality of feature maps based on at least a subset of the plurality of cropped images;
merging at least a subset of the plurality of feature maps to form a merged feature map; and
producing an output image based on the merged feature map.

8. The method of claim 7, wherein cropping the input image is performed according to a first pattern, and wherein merging the subset of the plurality of feature maps is performed also according to the first pattern.

9. The method of claim 7, wherein the AI chip contains a convolution neural network (CNN) model having a size lower than a size of the input image and also lower than a size of the output image.

10. The method of claim 9 further comprising training weights of the CNN model in the AI chip by:
receiving a sample training image;
cropping the sample training image to a plurality of cropped sample images;
performing convolutions over at least a subset of the plurality of cropped sample images based on the weights of the CNN model to produce a plurality of training feature maps;
merging at least a subset of the plurality of training feature maps to produce a merged training feature map; and
in one or more iterations, updating the weights of the CNN model based on the merged training feature map by repeating the operations of performing convolutions and merging.

11. The method of claim 10, wherein the input image is cropped in a first pattern and the sample training image is cropped also in the first pattern, and wherein the subset of the plurality of feature maps are merged in a second pattern and the subset of the plurality of training feature maps are merged also in the second pattern.

12. The method of claim 11, wherein the first pattern and the second pattern are the same.

13. One or more computer-readable non-transitory storage media, the media encoded with instructions for performing operations comprising:
receiving an input image;
cropping the input image into a plurality of cropped images;
executing a convolution neural network (CNN) model to produce a plurality of feature maps based on at least a subset of the plurality of cropped images;
merging at least a subset of the plurality of feature maps to form a merged feature map; and
producing an output image based on the merged feature map.

14. The media of claim 13, wherein cropping the input image is operated according to a first pattern, and wherein merging the subset of the plurality of feature maps is operated also according to the first pattern.

15. The media of claim 13, wherein the CNN model has a size lower than a size of the input image and also lower than a size of the output image.

16. The media of claim 15, wherein the operations further comprise training weights of the CNN model by:
receiving a sample training image;
cropping the sample training image to a plurality of cropped sample images;
performing convolutions over at least a subset of the plurality of cropped sample images based on the weights of the CNN model to produce a plurality of training feature maps;
merging at least a subset of the plurality of training feature maps to produce a merged training feature map; and
in one or more iterations, updating the weights of the CNN model based on the merged training feature map by repeating the operations of performing convolutions and merging.

17. The media of claim 16, wherein the input image is cropped in a first pattern and the sample training image is cropped also in the first pattern, and wherein the subset of the plurality of feature maps are merged in a second pattern and the subset of the plurality of training feature maps are merged also in the second pattern.

18. A system comprising:
a processor;
an image sensor configured to capture one or more images;
an artificial intelligence (AI) chip coupled to the processor; and
a non-transitory computer readable medium containing programming instructions that, when executed, will:
cause the image sensor to capture an input image;
cause the processor to crop the input image into a plurality of cropped images;
cause the AI chip to produce a plurality of feature maps based on at least a subset of the plurality of cropped images;

merge at least a subset of the plurality of feature maps to form a merged feature map; and produce an output image based on the merged feature map.

19. The system of claim 18, wherein the instructions for cropping the input image are configured to crop the input image according to a first pattern, and wherein the instructions for merging the subset of the plurality of feature maps are configured to merge the subset of the plurality of feature maps also according to the first pattern.

20. The system of claim 18, wherein the AI chip contains a convolution neural network (CNN) model having a size lower than a size of the input image and also lower than a size of the output image.

* * * * *